United States Patent
Zhao

(10) Patent No.: US 9,664,845 B2
(45) Date of Patent: May 30, 2017

(54) DOUBLE-SIDED DISPLAY APPARATUS

(71) Applicants: BOE TECHNOLOGY GROUP CO., LTD., Beijing (CN); BEIJING BOE DISPLAY TECHNOLOGY CO., LTD., Beijing (CN)

(72) Inventor: Feng Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 75 days.

(21) Appl. No.: 14/744,917

(22) Filed: Jun. 19, 2015

(65) Prior Publication Data
US 2016/0238781 A1    Aug. 18, 2016

(30) Foreign Application Priority Data

Feb. 12, 2015 (CN) .......................... 2015 1 0076673

(51) Int. Cl.
  *F21V 8/00*  (2006.01)
  *G02F 1/133*  (2006.01)

(52) U.S. Cl.
  CPC ........... *G02B 6/0088* (2013.01); *G02B 6/005* (2013.01); *G02B 6/0076* (2013.01)

(58) Field of Classification Search
  CPC ..... G02B 6/005; G02B 6/0076; G02B 6/0088
  See application file for complete search history.

(56) References Cited

U.S. PATENT DOCUMENTS

| 6,871,975 B2 * | 3/2005 | Chuang ................ G02B 6/0046 362/23.1 |
| 7,248,308 B2 * | 7/2007 | Mizutani .............. G02B 6/0055 349/65 |
| 7,403,243 B2 * | 7/2008 | Fukuyoshi ........ G02F 1/133308 349/58 |

(Continued)

FOREIGN PATENT DOCUMENTS

| CN | 1637501 A | 7/2005 |
| CN | 101813837 A | 8/2010 |
| CN | 103941473 A | 7/2014 |

OTHER PUBLICATIONS

First Chinese Office Action, of Chinese Patent Application No. 201510076673X, dated Feb. 6, 2017, 7 pages.

*Primary Examiner* — Peggy Neils
(74) *Attorney, Agent, or Firm* — Kinney & Lange, P.A.

(57) ABSTRACT

A double-sided display apparatus comprises: a first display panel and a second display panel arranged opposite to each other; and a first frame and a second frame located in a region between the first and the second display panels. The first frame comprises a first support base connecting with the first display panel and having a hollow structure, and a first sidewall connected to the first support base; the second frame comprises a second support base connecting with the second display panel and having a hollow structure, and a second sidewall connected to the second support base; the first and the second sidewalls are arranged opposite to each other; a surface of the first sidewall facing the second sidewall is provided with a first protrusion part, and a surface of the second sidewall facing the first sidewall is provided with a first position limit part engaging with the first protrusion part.

20 Claims, 6 Drawing Sheets

(56) References Cited

U.S. PATENT DOCUMENTS

| | | | |
|---|---|---|---|
| 7,751,182 B2 * | 7/2010 | Park | G06F 1/1626 361/679.09 |
| 8,558,780 B2 * | 10/2013 | Lee | G09F 9/35 345/102 |
| 2004/0080924 A1 | 4/2004 | Chuang | |
| 2004/0145688 A1 | 7/2004 | Mizutani et al. | |
| 2010/0201908 A1 * | 8/2010 | Ishida | G02F 1/133308 349/58 |
| 2013/0077347 A1 * | 3/2013 | Hsu | G02F 1/13 362/613 |

* cited by examiner

DOUBLE-SIDED DISPLAY APPARATUS

CROSS-REFERENCE TO RELATED APPLICATION

This application claims the benefit of Chinese Patent Application No. 201510076673.X filed on Feb. 12, 2015 in the State Intellectual Property Office of China, the whole disclosure of which is incorporated herein by reference.

BACKGROUND OF THE INVENTION

Field of the Invention

Embodiments of the present invention relate to a double-sided display apparatus.

Description of the Related Art

A conventional double-sided display apparatus is composed of two separate single-sided display devices. The two display devices of the double-sided display apparatus must be fixed by means of an additional support structure. Therefore, the double-sided display apparatus is bulky in structure and large in thickness.

SUMMARY OF THE INVENTION

Embodiments of the present invention provide a double-sided display apparatus which is light in weight and small in thickness.

According to embodiments of the present invention, there is provided a double-sided display apparatus comprising: a first display panel and a second display panel arranged opposite to each other; and a first frame and a second frame located in a region between the first display panel and the second display panel, wherein the first frame comprises a first support base connecting with the first display panel and having a hollow structure, and a first sidewall connected to the first support base; the second frame comprises a second support base connecting with the second display panel and having a hollow structure, and a second sidewall connected to the second support base; the first sidewall and the second sidewall are arranged opposite to each other; a surface of the first sidewall facing the second sidewall is provided with a first protrusion part, and a surface of the second sidewall facing the first sidewall is provided with a first position limit part engaging with the first protrusion part.

Figure 1:
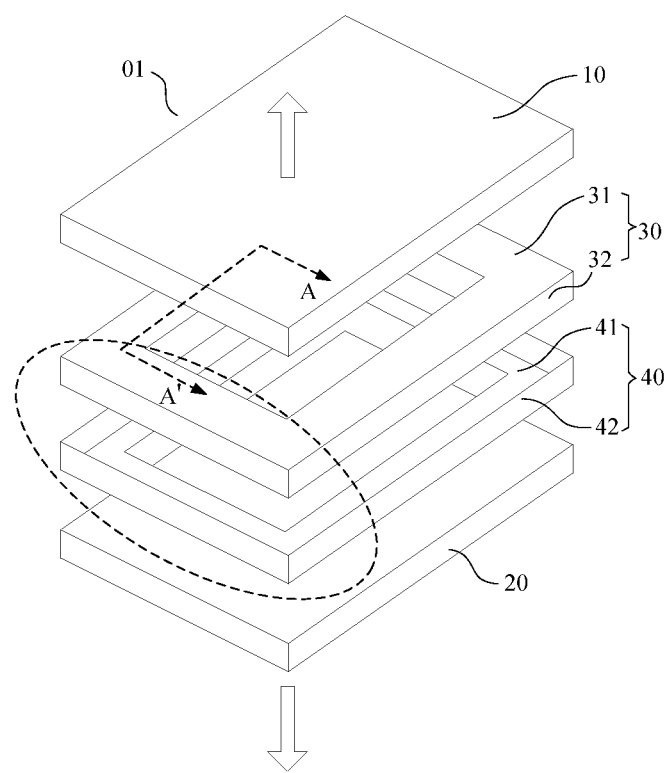
FIG. 1 is a schematic exploded perspective view of a double-sided display apparatus according to an embodiment of the present invention.

The reference numerals in the drawings are listed as follows:

01-double-sided display apparatus; 10-first display panel; 20-second display panel; 30-first frame; 31-first support base; 310-first support base extension part; 311-first support base expansion part; 32-first sidewall; 32a-first surface; 33-first protrusion part; 33a-first distal end surface; 33b-first proximal end cross section; 34-second position limit part; 35-first adhesive tape adhesion groove; 40-second frame; 41-second support base; 410-second support base extension part; 411-second support base expansion part; 42-second sidewall; 42a-second surface; 43-first position limit part; 44-second protrusion part; 44a-second distal end surface; 44b-second proximal end cross section; 45-second adhesive tape adhesion groove; 50-double-sided adhesive tape; 60-light guide plate; 61-first light guide plate; 62-second light guide plate; 70-double-sided reflection plate; 81-first optical film; 82-second optical film; and 90-cushion strip.

DETAILED DESCRIPTION OF THE EMBODIMENTS

A further description of the invention will be made in detail as below with reference to embodiments of the present invention taken in conjunction with the accompanying drawings. The following embodiments are intended to explain the present invention and the present invention should not be construed as being limited to the embodiment set forth herein.

According to embodiments of the present invention, there is provided a double-sided display apparatus 01. As shown in FIG. 1, the double-sided display apparatus 01 comprises: a first display panel 10 and a second display panel 20 arranged opposite to each other; and a first frame 30 and a second frame 40 located in a region between the first display panel 10 and the second display panel 20. The first frame 30 comprises a first support base 31 connecting with the first display panel 10 and having a hollow structure, and a first sidewall 32 connected to the first support base 31; and the second frame 40 comprises a second support base 41 connecting with the second display panel 20 and having a hollow structure, and a second sidewall 42 connected to the second support base 41.

Figure 2A:
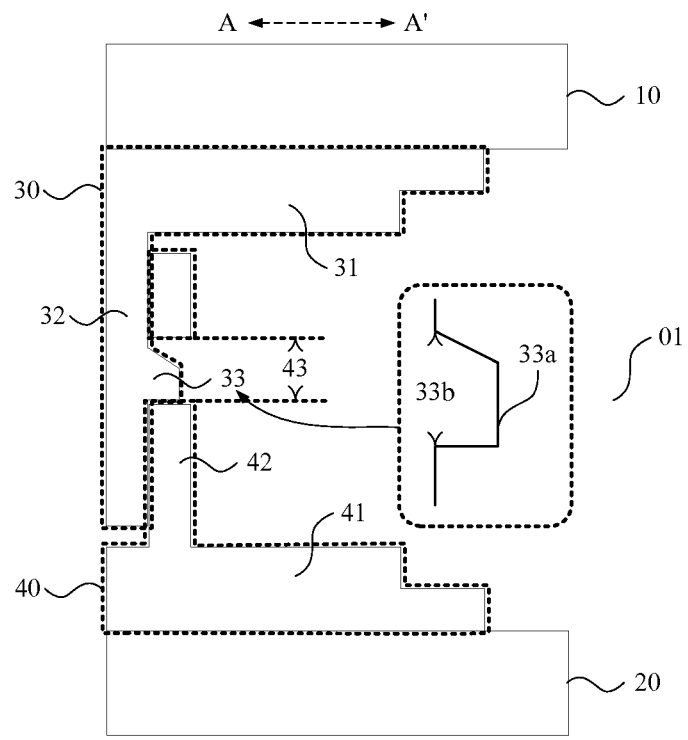
FIG. 2a is a schematic sectional view taken along a direction A-A' in FIG. 1 and showing a structure of a double-sided display apparatus according to an embodiment of the present invention.
Figure 2B:
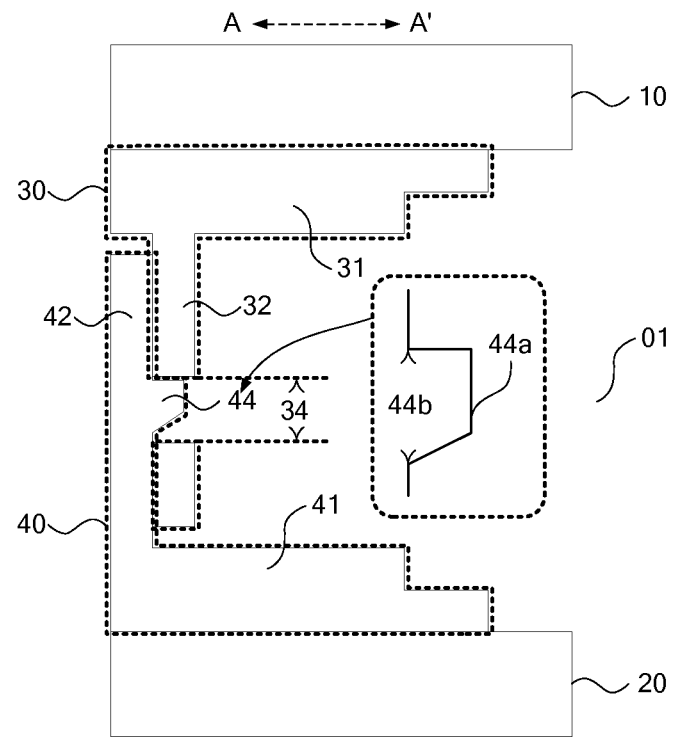
FIG. 2b is a schematic sectional view taken along the direction A-A' in FIG. 1 and showing a structure of a double-sided display apparatus according to another embodiment of the present invention.

As shown in FIGS. 2a and 2b, the first sidewall 32 and the second sidewall 42 are arranged opposite to each other. A surface of the first sidewall 32 facing the second sidewall 42 is provided with a first protrusion part 33, and a surface of the second sidewall 42 facing the first sidewall 32 is provided with a first position limit part 43 engaging with the first protrusion part 33; and\or, the surface of the second sidewall 42 facing the first sidewall 32 is provided with a second protrusion part 44, and the surface of the first sidewall 32 facing the second sidewall 42 is provided with a second position limit part 34 engaging with the second protrusion part 44.

With the double-sided display apparatus 01 according to the embodiments of the present invention, users can watch pictures displayed on the first display panel 10 and the second display panel 20 from both sides opposite to each other simultaneously. Therefore, the first display panel 10 and the second display panel 20 must have opposite light emitting directions. In other words, when the double-sided display apparatus 01 is horizontally placed, as shown in FIG. 1, the light emitting direction of the first display panel 10 is vertically upward as indicated by the arrow in the figure, while the light emitting direction of the second display panel 20 is vertically downward as indicated by the arrow in the figure.

Referring to FIG. 1, in an example, each of the first frame 30 and the second frame 40 may have a rectangular-ring shape. A recessed space is formed inside the first frame 30 due to the first support base 31 having the hollow structure and the first sidewall 32 connected to the first support base 31. Likewise, a recessed space is also formed inside the second frame 40 due to the second support base 41 having the hollow structure and the second sidewall 42 connected to the second support base 41.

Therefore, in the double-sided display apparatus 01 according to the embodiments of the present invention, the first sidewall 32 is arranged opposite to the second sidewall 42. For example, referring to FIG. 2a, the second sidewall 42 of the second frame 40 is located in the inner recessed space of the first frame 30 or inside the first sidewall 32 so that the second sidewall 42 is arranged opposite to the first sidewall 32. Alternatively, the first sidewall 32 is arranged opposite to the second sidewall 42, and specifically, referring to FIG. 2b, the first sidewall 32 of the first frame 30 is located in the inner recessed space of the second frame or inside the second sidewall 42 so that the first sidewall 32 is arranged opposite to the second sidewall 42.

Figure 3A:
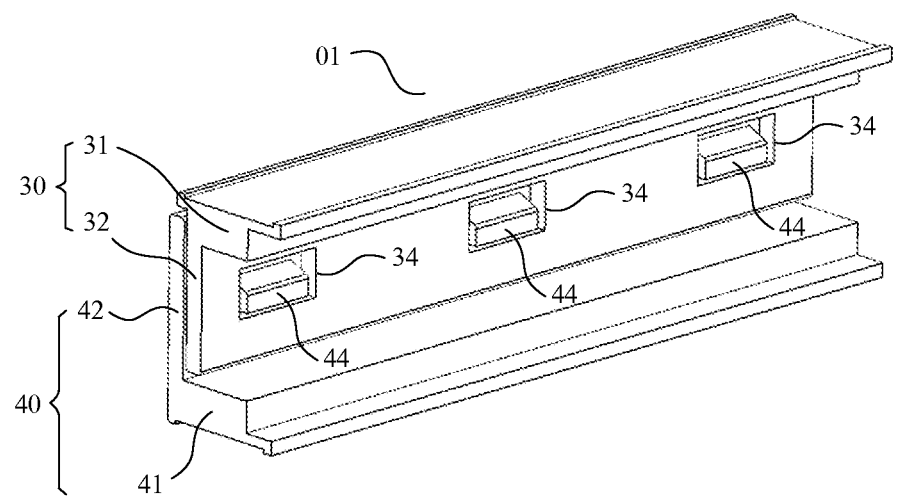
FIG. 3a is a schematic enlarged perspective view showing a structure of a portion indicated by the dashed line in FIG. 1 and viewed from insides of recesses of first and second frames.
Figure 3B:
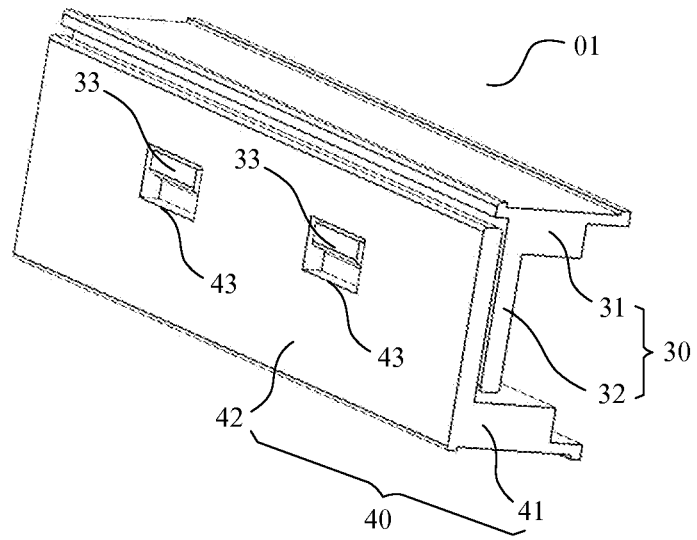
FIG. 3b is a schematic enlarged perspective view showing a structure of a portion indicated by the dashed line in FIG. 1 and viewed from outside of frame bodies of the first and second frames.

As shown in FIGS. 3a and 3b, the first frame 30 and the second frame 40 engages with and are fixed to each other by engaging the first protrusion part 33 with the first position limit part 43 and/or by engaging the second position limit part 34 with the second protrusion part 44.

FIGS. 3a and 3b illustrate only an example in which the first sidewall 32 is located in the recessed space of the second frame 40. Of course, the second sidewall 42 may also be located in the recessed space of the first frame 30. In this case, the principle of engagement and fixation is the same as the above example and is no longer described for the sake of brevity.

Here, the first protrusion part 33 and/or the second protrusion part 44 are/is not limited in specific shape so long as they can achieve a function of engagement of a protrusion. For example, the first protrusion part 33 and/or the second protrusion part 44 may have a wedge shape, a cubic shape, a column shape, a prism shape or the like. Accordingly, the first position limit part 43 and/or the second position limit part 34 are/is not limited in specific shape so long as they can achieve a function of limiting positions of the first protrusion part 33 and/or the second protrusion part 44. For example, the first position limit part 43 and/or the second position limit part 34 may have a groove shape, or a through-hole shape shown in FIG. 2a or 2b. When the specific shape of the first position limit part 43 and/or the second position limit part 34 is a groove shape, openings of the grooves are disposed to face the first protrusion part 33 and/or the second protrusion part 44 in order to achieve the position limiting function.

In the double-sided display apparatus according to the embodiment of the present invention, referring to FIGS. 3a and 3b, the first frame 30 and the second frame 40 are engaged together by engagement of the first protrusion part 33 with the first position limit part 43 and/or by engagement of the second position limit part 34 with the second protrusion part 44, so that the first display panel 10 and the second display panel 20 are combined together in such a way as to be opposite to each other. As a result, frame structures of separate display devices and an additional support device are eliminated so that the double-sided display apparatus 01 has the advantages that it is frame-free and can be easily assembled. On the other hand, the first frame 30 and the second frame 40 are located in the region between the first display panel 10 and the second display panel 20 and the first sidewall 32 is arranged opposite to the second sidewall 42. In other words, the recessed space of the first frame 30 overlaps with the recessed space of the second frame 40. Therefore, the first frame 30 and the second frame 40 occupy a small space in the double-sided display apparatus 01, so that the resultant double-sided display apparatus 01 has both advantages that it is light and thin in entire structure, and small in thickness. As a result, the double-sided display apparatus can provide a user with a better use experience and is more suitable to current development trend of lightening and thinning of the display apparatus and narrowing a frame of the display apparatus.

Figure 4A:
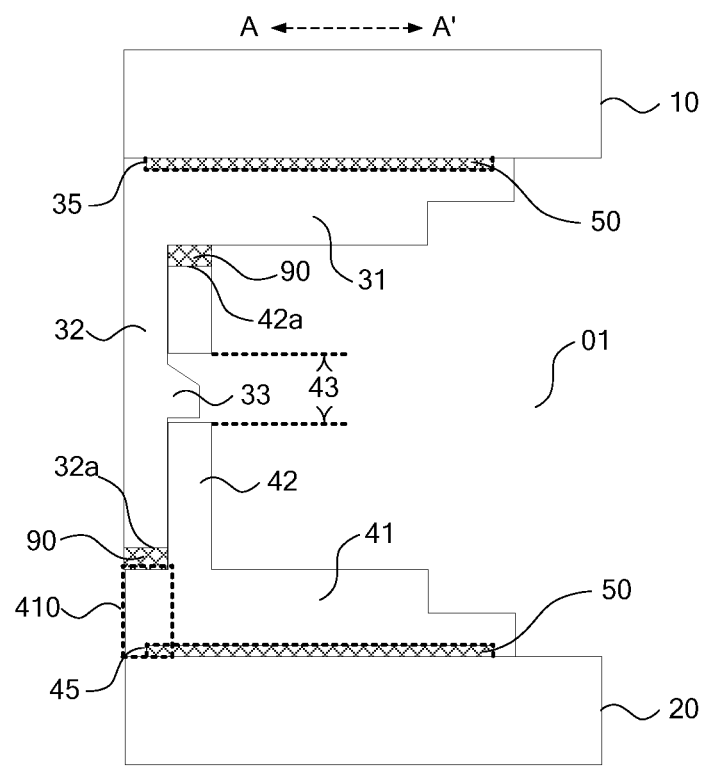
FIG. 4a is a schematic sectional view taken along the direction A-A' in FIG. 1 and showing a structure of a double-sided display apparatus according to a further embodiment of the present invention.
Figure 4B:
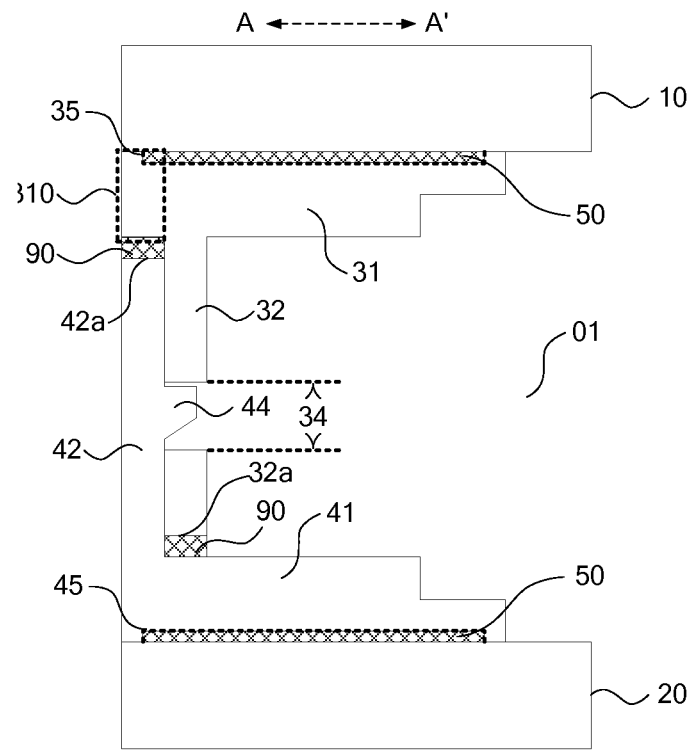
FIG. 4b is a schematic sectional view taken along the direction A-A' in FIG. 1 and showing a structure of a double-sided display apparatus according to yet another embodiment of the present invention.

In some embodiments, the first display panel 10 and the second display panel 20 may be connected to the first support base 31 and the second support base 41, respectively, in the following way. As shown in FIGS. 4a and 4b, a first adhesive tape adhesion groove 35 is disposed on a surface of the first support base 31 facing the first display panel 10, and the first support base 31 is connected to the first display panel 10 by means of a double-sided adhesive tape 50 located in the first adhesive tape adhesion groove 35; and a second adhesive tape adhesion groove 45 is disposed on a surface of the second support base 41 facing the second display panel 20, and the second support base 41 is connected to the second display panel 20 by means of a double-sided adhesive tape 50 located in the second adhesive tape adhesion groove 45.

Here, thicknesses of the double-sided adhesive tapes 50 having a double-sided fixation function may be set to be equal to or slightly greater than depths of the first adhesive tape adhesion groove 35 and the second adhesive tape adhesion groove 45, respectively.

In this way, since the double-sided adhesive tapes which connect the first support base 31 and the second support base 41 to the first display panel 10 and the second display panel 20, respectively, are located in recesses of the first adhesive tape adhesion groove 35 and the second adhesive tape adhesion groove 45, the surface of the first support base 31 facing the first display panel 10 can be closely fixed to the first display panel 10 and the surface of the second support base 41 facing the second display panel 20 can also be closely fixed to the second display panel 20. As a result, a thickness of the assembled double-sided display apparatus 01 can be further decreased.

Referring to FIGS. 2*a*-3*b*, in some embodiments, the first position limit part 43 is a groove or a through hole; and/or, the second position limit part 34 is a groove or a through hole.

Considering that the first sidewall 32 and the second sidewall 42 usually have small thicknesses, it is less difficult to form the through holes than to form the grooves in the first sidewall 32 and the second sidewall 42, and the through holes are simple in structure and workpieces with the through holes formed therein have a higher dimensional accuracy. Therefore, both the first position limit part 43 and the second position limit part 34 may be the through holes.

In some embodiments, in order to reduce difficulty of aligning the first protrusion part 33 with the first position limit part 43 and/or aligning the second protrusion part 44 with the second position limit part 34 when engaging the first protrusion part 33 with the first position limit part 43 and/or engaging the second protrusion part 44 with the second position limit part 34, the first protrusion part 33 and/or the second protrusion part 44 have a wedge-shaped structure. In other words, referring to FIGS. 2*a* and 2*b*, a first distal end surface 33*a* of the first protrusion part 33 away from the first sidewall 32 is less than a first proximal end cross section 33*b* of the first protrusion part 33 adjoining the first sidewall 32; and/or a second distal end surface 44*a* of the second protrusion part 44 away from the second sidewall 42 is less than a second proximal end cross section 44*b* of the second protrusion part 44 adjoining the second sidewall 42.

Figure 5A:
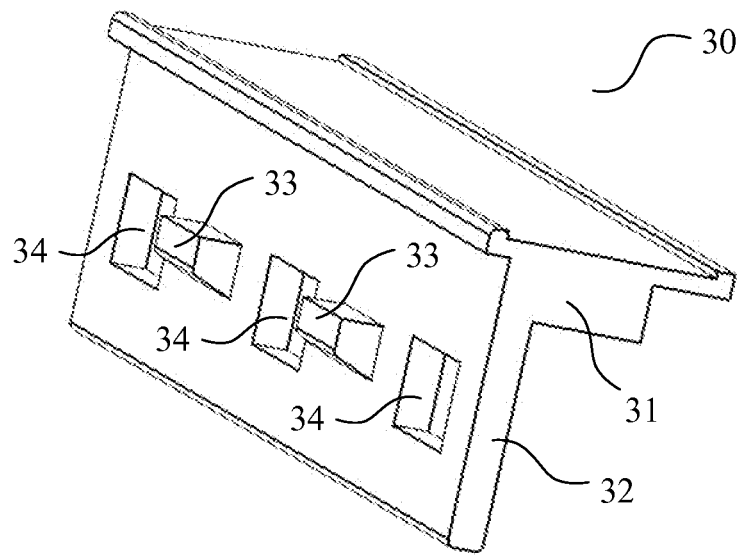
FIG. 5a is a schematic perspective view showing a structure of the first frame of the double-sided display apparatus according to an embodiment of the present invention.
Figure 5B:
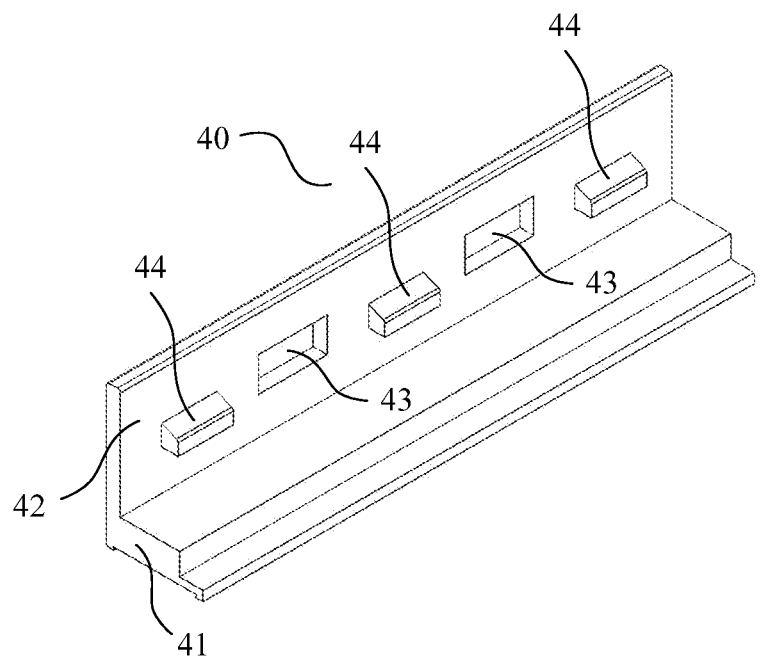
FIG. 5b is a schematic perspective view corresponding to FIG. 5a and showing a structure of the second frame of the double-sided display apparatus according to an embodiment of the present invention.

In some embodiments, considering that both the first frame 30 and the second frame 40 have the protrusion parts and the position limit parts so that they more firmly engage with each other, as shown in FIG. 5*a*, the first protrusion part comprises a plurality of first protrusion parts, the first position limit part comprises a plurality of first position limit parts, the second protrusion part comprises a plurality of second protrusion parts, the second position limit part comprises a plurality of second position limit parts, the surface of the first sidewall 21 facing the second sidewall 42 is provided with the first protrusion parts 33 and the second position limit parts 34 which are alternately arranged; and accordingly, as shown in FIG. 5*b*, the surface of the second sidewall 42 facing the first sidewall 32 is provided with the second protrusion parts 44 and the first position limit parts 43 which are alternately arranged.

With the above staggered design of the first protrusion parts 33 and the second position limit parts 34 alternately arranged and the second protrusion parts 44 and the first position limit parts 43 alternately arranged accordingly, the first frame 30 and the second frame 40 form an engaged structure so that they are firmly fixed to each other.

FIGS. 4*a* and 4*b* illustrate only the embodiment in which the first protrusion parts 33 and the second position limit parts 34 are alternately arranged in one row and the second protrusion parts 44 and the first position limit parts 43 are alternately arranged in one row.

When the first display panel 10 and the second display panel 20 are large in size, in order that the assembled double-sided display apparatus 01 is firmer in structure, the first sidewall 21 and the second sidewall 42 may have a large width. In this case, the first sidewall 21 may be provided with a plurality of parallel rows of the first protrusion parts 33 and the second position limit parts 34 which are alternately arranged in each row, and likewise, the second sidewall 42 may be provided with a plurality of parallel rows of the second protrusion parts 44 and the first position limit parts 43 which are alternately arranged in each row.

In some embodiments, considering that if the first frame 30 and the second frame 40 receive a force more uniformly when they engage with each other, the assembled double-sided display apparatus 01 has a better impact resistance to an external force. Therefore, in the first frame 30, the first protrusion parts 33 and the second position limit parts 34 are arranged at equal intervals. Correspondingly, in the second frame 40, the second protrusion parts 44 and the first position limit parts 43 are also arranged at equal intervals which are the same as those of the first protrusion parts 33 and the second position limit parts 34.

In some embodiments, in order that the engaged first and second frames 30 and 40 are firmer in structure, referring to FIG. 4*a*, optionally, the second sidewall 42 is located in the first frame 30 (not indicated in FIG. 4*a*); the second frame 40 (not indicated in FIG. 4*a*) further comprises a second support base extension part 410 connected to the second support base 41, and the second support base extension part 410 is located outside the second sidewall 42; the first sidewall 32 comprises a first surface 32*a* located away from or parallel to the first support base 31; and the double-sided display apparatus 01 further comprises a cushion strip 90 between the first surface 32*a* and the second support base extension part 410.

In the embodiments, for example, the cushion strip 90 may be made of silica gel or foam, or double-sided adhesive foam or double-sided adhesive foam tape.

In this way, the second support base extension part 410 and the first surface 32*a* of the first sidewall 32 can be closely attached together through the cushion strip 90, thereby improving structural firmness of the engaged first and second frames 30 and 40.

Furthermore, referring to FIG. 4*a*, the second sidewall 42 comprises a second surface 42*a* located away from the second support base 41, and the double-sided display apparatus 01 further comprises a cushion strip 90 disposed between the second surface 42*a* and the first support base 31.

In this way, the first support base 31 and the second surface 42*a* of the second sidewall 42 are closely attached together through the cushion strip 90, thereby further improving structural firmness of the engaged first and second frames 30 and 40.

In some embodiments, in order that the engaged first and second frames 30 and 40 are firmer in structure, referring to FIG. 4*b*, optionally, the first sidewall 32 is located in the second frame 40 (not indicated in FIG. 4*b*); the first frame 30 (not indicated in FIG. 4*b*) further comprises a first support base extension part 310 connected to the first support base 31, and the first support base extension part 310 is located outside the first sidewall 32; the second sidewall 42 comprises a second surface 42*a* located away from or parallel to the second support base 41; and the double-sided display apparatus 01 further comprises a cushion strip 90 disposed between the second surface 42*a* and the first support base extension part 310.

In this way, the first support base extension part 310 and the second surface 42*a* of the second sidewall 42 of the second support base 41 are closely attached together through the cushion strip 90, thereby improving structural firmness of the engaged first and second frames 30 and 40.

Furthermore, referring to FIG. 5*b*, the first sidewall 32 comprises a first surface 32*a* located away from the first support base 31, and the double-sided display apparatus 01 further comprises a cushion strip 90 disposed between the first surface 32a and the second support base extension part 41.

In this way, the second support base 41 and the first surface 32a of the first sidewall 32 are closely attached together through the cushion strip 90, thereby further improving structural firmness of the engaged first and second frames 30 and 40.

Figure 6A:
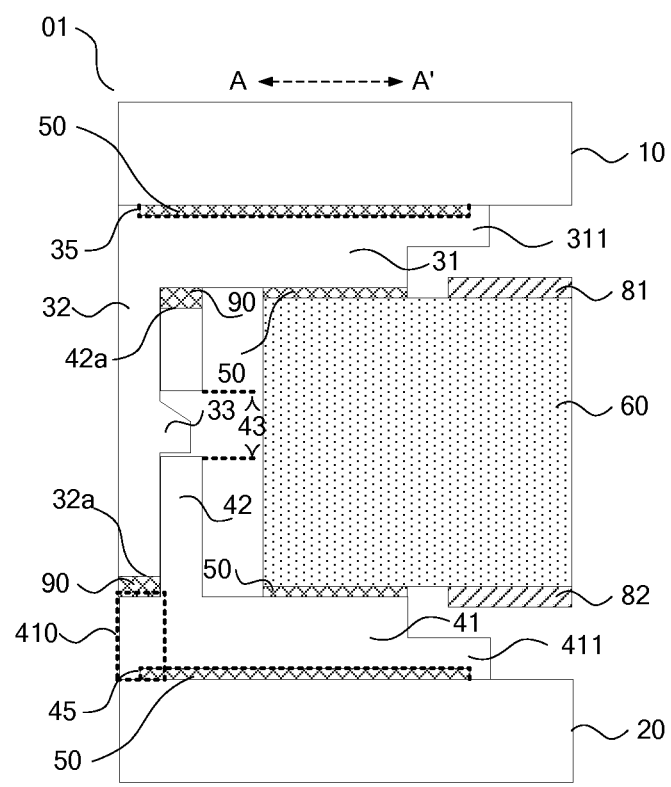
FIG. 6a is a schematic sectional view taken along the direction A-A' in FIG. 1 and showing a structure of a double-sided display apparatus according to a still further embodiment of the present invention.

In the double-sided display apparatus 01 according to the embodiments, the first display panel 10 and the second display panel 20 are specifically liquid crystal display panels that perform the display by means of light of a backlight module. Optionally, the first display panel 10 and the second display panel 20 may share a single light guide plate. Specifically, as shown in FIG. 6a, the double-sided display apparatus 01 further comprises:

a light guide plate 60 located in a space defined by the first frame 30 and the second frame 40 and a double-sided adhesive tape 50 disposed on at least one of opposite surfaces of the first support base 31 and the second support base 41 and configured to fix the light guide plate 60.

Here, since the first display panel 10 and the second display panel 20 are arranged opposite to each other, a light source of the backlight module is located on a side, closing to the recessed space, of the first sidewall 32 or the second sidewall 42. Therefore, referring to FIG. 1, when the first display panel 10 and the second display panel 20 share the single light guide plate 60, there is no loss of light since after the light enters the light guide plate 60 (not indicated in FIG. 1, referring to FIGS. 6a and 6b) from an optical source, an upward portion of the light emitted from the light guide plate 60 provides the first display panel 10 with a backlight source, while a downward portion of the light emitted from the light guide plate 60 provides the second display panel 20 with a backlight source. Therefore, when the two display panels share the single light guide plate 60, it is not necessary to provide a reflection plate, thereby further simplifying the structure of the double-sided display apparatus 01.

Figure 6B:
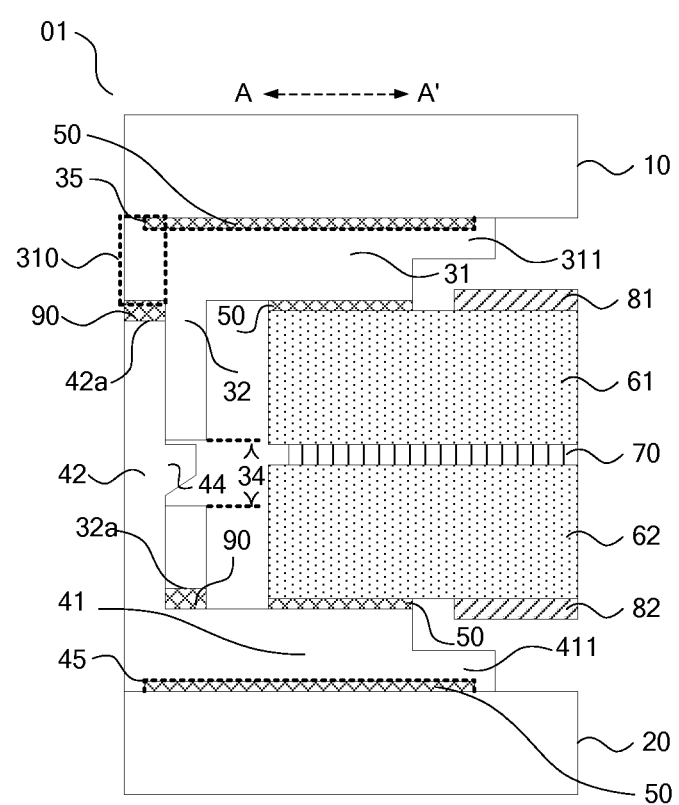
FIG. 6b is a schematic sectional view taken along the direction A-A' in FIG. 1 and showing a structure of a double-sided display apparatus according to still another embodiment of the present invention.

In addition, optionally, the first display panel 10 and the second display panel 20 may correspond to different light guide plates, respectively. Specifically, as shown in FIG. 6b, the double-sided display apparatus 01 further comprises:

a first light guide plate 61 and a second light guide plate 62 located in a space defined by the first frame 30 and the second frame 40 and arranged opposite to each other, a double-sided adhesive tape 50 disposed on a surface of the first support base 31 facing the second support base 41 and configured to fix the first light guide plate 61, and a double-sided adhesive tape 50 disposed on a surface of the second support base 41 facing the first support base 31 and configured to fix the second light guide plate 62.

In the embodiment, the first display panel 10 and the second display panel 20 correspond to the independent light guide plates, respectively. In order to improve a utilization rate of a backlight source of which light enters a light guide plate from a side surface of the light guide plate, referring to FIG. 6b, the double-sided display apparatus 01 further comprises a double-sided reflection plate 70 between the first light guide plate 61 and the second light guide plate 62.

For example, each of an upper surface and a lower surface of the double-sided reflection plate 70 has a reflection structure such as microprisms.

In the embodiments, referring to FIG. 6a, the double-sided display apparatus 01 further comprises: a first optical film 81 located on a surface of the light guide plate 60 facing the first display panel 10, and a second optical film 82 located on another surface of the light guide plate 60 facing the second display panel 20.

Alternatively, referring to FIG. 6b, the double-sided display apparatus 01 further comprises: a first optical film 81 located on a surface of the first light guide plate 61 facing the first display panel 10, and a second optical film 82 located on a surface of the second light guide plate 62 facing the second display panel 20.

In the embodiments, referring to FIGS. 6a and 6b, in order to avoid the first optical film 81 and the second optical film 82 from being separated from both surfaces of the light guide plate 60 or the first light guide plate 61 and the second light guide plate 62, the first frame 30 (not indicated in FIGS. 6a and 6b) further comprises: a first support base expansion part 311 located on a side of the first support base 31 away from the first sidewall 32, configured to limit a position of the first optical film 81, and having a thickness less than a thickness of the first support base 31; and the second frame 40 (not indicated in FIGS. 6a and 6b) further comprises: a second support base expansion part 411 located on a side of the second support base 41 away from the second sidewall 42, configured to limit a position of the second optical film 82, and having a thickness less than a thickness of the second support base 41.

In this way, in the first frame 30, the first support base expansion part 311 is equivalent to a step expanding and extending from the hollow-structured first support base 31 towards an inner region of the hollow structure, so that the first optical film 81 is more firmly constrained in the recessed space of the first frame 30 and cannot be deflected.

Likewise, in the second frame 40, the second support base expansion part 411 is equivalent to a step expanding and extending from the hollow-structured second support base 41 towards an inner region of the hollow structure, so that the second optical film 82 is more firmly constrained in the recessed space of the second frame 40 and cannot be deflected.

Here, since the first frame 30 and the second frame 40 are usually formed of plastic material by means of injection molding, the first support base 31, the first support base extension part 310, the first support base expansion part 311, the first sidewall 32 and the first protrusion part 33 of the first frame 30 are formed in an integrated structure.

Likewise, the second support base 41, the second support base extension part 410, the second support base expansion part 411, the second sidewall 42 and the second protrusion part 44 of the second frame 40 are formed in an integrated structure.

The above embodiments are only used to explain the present invention, and should not be construed to limit the present invention. It will be understood by those skilled in the art that various changes and modifications may be made therein without departing from the spirit of the present invention, the scope of which is defined in the appended claims and their equivalents.

What is claimed is:
1. A double-sided display apparatus comprising:
a first display panel and a second display panel arranged opposite to each other; and
a first frame and a second frame which are located between the first display panel and the second display panel; wherein:

the first frame comprises a first support base connected with the first display panel and having a hollow structure, and a first sidewall connected with the first support base;

the second frame comprises a second support base connected with the second display panel and having a hollow structure, and a second sidewall connected with the second support base;

the first display panel is connected to a surface, away from the second support base, of the first support base, and the second display panel is connected to a surface, away from the first support base, of the second support base;

the first sidewall and the second sidewall are arranged opposite to each other and one of the first sidewall and the second sidewall is disposed inside the other; and a surface of the first sidewall facing the second sidewall is provided with a first protrusion part, and a surface of the second sidewall facing the first sidewall is provided with a first position limit part engaged with the first protrusion part.

2. The double-sided display apparatus of claim 1, wherein:

the surface of the second sidewall facing the first sidewall is provided with a second protrusion part, and the surface of the first sidewall facing the second sidewall is provided with a second position limit part engaged with the second protrusion part.

3. The double-sided display apparatus of claim 2, wherein:

the first protrusion part comprises a plurality of first protrusion parts;

the first position limit part comprises a plurality of first position limit parts;

the second protrusion part comprises a plurality of second protrusion parts;

the second position limit part comprises a plurality of second position limit parts;

the first protrusion parts and the second position limit parts are alternately arranged, and the second protrusion parts and the first position limit parts are alternately arranged.

4. A double-sided display apparatus comprising:

a first display panel and a second display panel arranged opposite to each other; and a first frame and a second frame located in a region between the first display panel and the second display panel; wherein:

the first frame comprises a first support base connected with the first display panel and having a hollow structure, and a first sidewall connected with the first support base;

the second frame comprises a second support base connected with the second display panel and having a hollow structure, and a second sidewall connected with the second support base;

the first sidewall and the second sidewall are arranged opposite to each other;

a surface of the first sidewall facing the second sidewall is provided with a first protrusion part, and a surface of the second sidewall facing the first sidewall is provided with a first position limit part engaged with the first protrusion part;

the second sidewall is located in the first frame;

the second frame further comprises a second support base extension part connected to the second support base and located outside the second sidewall;

the first sidewall comprises a first surface located away from the first support base, and the double-sided display apparatus further comprises a cushion strip located between the first surface and the second support base extension part.

5. The double-sided display apparatus of claim 4, wherein:

the second sidewall comprises a second surface located away from the second support base, and the double-sided display apparatus further comprises a cushion strip located between the second surface and the first support base.

6. The double-sided display apparatus of claim 1, wherein:

each of the first frame and the second frame has a rectangular-ring shape.

7. The double-sided display apparatus of claim 1 further comprising:

a light guide plate located in a space defined by the first frame and the second frame.

8. The double-sided display apparatus of claim 7 further comprising:

a double-sided adhesive tape disposed on at least one of opposite surfaces of the first support base and the second support base, and configured to fix the light guide plate.

9. The double-sided display apparatus of claim 1 further comprising:

a first light guide plate and a second light guide plate located in a space defined by the first frame and the second frame, and arranged opposite to each other.

10. The double-sided display apparatus of claim 9 further comprising:

a double-sided adhesive tape disposed on a surface of the first support base facing the second support base, and configured to fix the first light guide plate, and a double-sided adhesive tape disposed on a surface of the second support base facing the first support base, and configured to fix the second light guide plate.

11. The double-sided display apparatus of claim 9 further comprising:

a double-sided reflection plate located between the first light guide plate and the second light guide plate.

12. The double-sided display apparatus of claim 7 further comprising:

a first optical film located on a surface of the light guide plate facing the first display panel; and a second optical film located on another surface of the light guide plate facing the second display panel.

13. The double-sided display apparatus of claim 9 further comprising: a first optical film located on a surface of the first light guide plate facing the first display panel, and a second optical film located on a surface of the second light guide plate facing the second display panel.

14. The double-sided display apparatus of claim 12, wherein:

the first frame further comprises: a first support base expansion part located on a side of the first support base away from the first sidewall, configured to limit a position of the first optical film, and having a thickness less than a thickness of the first support base; and the second frame further comprises: a second support base expansion part located on a side of the second support base away from the second sidewall, configured to limit a position of the second optical film, and having a thickness less than a thickness of the second support base.

15. The double-sided display apparatus of claim 13, wherein:
the first frame further comprises: a first support base expansion part located on a side of the first support base away from the first sidewall, configured to limit a position of the first optical film, and having a thickness less than a thickness of the first support base; and
the second frame further comprises: a second support base expansion part located on a side of the second support base away from the second sidewall, configured to limit a position of the second optical film, and having a thickness less than a thickness of the second support base.

16. The double-sided display apparatus of claim 1, wherein:
a first adhesive tape adhesion groove is disposed on a surface of the first support base facing the first display panel, and the first support base is connected to the first display panel by a double-sided adhesive tape located in the first adhesive tape adhesion groove; and
a second adhesive tape adhesion groove is disposed on a surface of the second support base facing the second display panel, and the second support base is connected to the second display panel by a double-sided adhesive tape located in the second adhesive tape adhesion groove.

17. The double-sided display apparatus of claim 1, wherein:
the first position limit part comprises a groove or a through hole.

18. The double-sided display apparatus of claim 2, wherein:
the second position limit part comprises a groove or a through hole.

19. A double-sided display apparatus comprising:
a first display panel and a second display panel arranged opposite to each other; and
a first frame and a second frame located in a region between the first display panel and the second display panel; wherein:
the first frame comprises a first support base connected with the first display panel and having a hollow structure, and a first sidewall connected with the first support base;
the second frame comprises a second support base connected with the second display panel and having a hollow structure, and a second sidewall connected with the second support base;
the first sidewall and the second sidewall are arranged opposite to each other;
a surface of the first sidewall facing the second sidewall is provided with a first protrusion part, and a surface of the second sidewall facing the first sidewall is provided with a first position limit part engaged with the first protrusion part; and
the first protrusion part has a wedge shape, and, a first distal end surface of the first protrusion part away from the first sidewall is less than a first proximal end cross section of the first protrusion part adjoining the first sidewall.

20. The double-sided display apparatus of claim 2, wherein:
the second protrusion part has a wedge shape, and, a second distal end surface of the second protrusion part away from the second sidewall is less than a second proximal end cross section of the second protrusion part adjoining the second sidewall.

* * * * *